July 30, 1957 J. W. KELLER, JR 2,801,338
HIGH-SENSITIVITY VOLTAGE-COMPARATOR CIRCUIT
Filed March 23, 1954
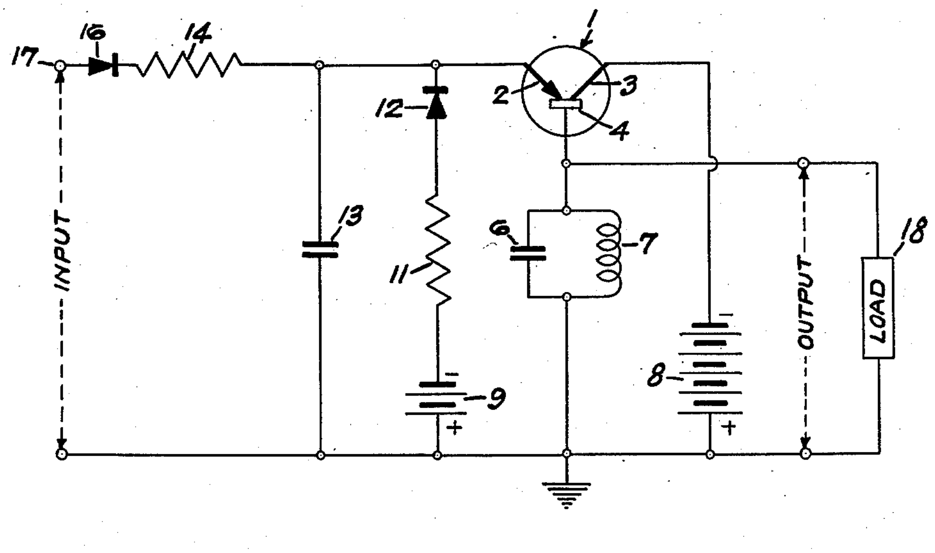
INVENTOR.
JOHN W. KELLER, JR.
BY
W. E. Thibodeau + A. W. Dew
ATTORNEYS United States Patent Office 2,801,338

Patented July 30, 1957

2,801,338

HIGH-SENSITIVITY VOLTAGE-COMPARATOR CIRCUIT

John W. Keller, Jr., Chevy Chase, Md., assignor to the United States of America as represented by the Secretary of the Army Application March 23, 1954, Serial No. 418,248

1 Claim. (Cl. 250—36)

(Granted under Title 35, U. S. Code (1952), sec. 266)

The invention described herein may be manufactured and used by or for the Government for governmental purposes without payment to me of any royalty thereon.

This invention relates to the sensing of voltages by means of a transistor circuit. More specifically, the invention provides a transistor circuit that switches from a quiescent to an oscillatory state upon receiving a triggering voltage in excess of a certain value. In a preferred embodiment, the input of the circuit normally presents negligible load to the signal source, and only trifling energy is required for triggering. As soon as the circuit has been triggered, an A.-C. output signal of relatively large amplitude and power becomes available.

In electronic technology, it is often desired to sense when a signal from a low-power source has reached a certain level, and to have this signal, upon reaching the critical level, initiate further action. The further action to be initiated often requires greater power or higher voltage than is available from the source. Furthermore, it may be desirable to have such power continue to be available after being switched on by a momentary triggering signal.

A well-known form of traisistor trigger circuit is a simple arrangement having only two resistors and a single power source in addition to the transistor. One of the resistors is connected between the base of the transistor and ground, while the other is connected between the collector and the power source. This circuit is bistable and can be triggered to either of two D.-C. states by applying to the emitter a pulse of suitable polarity.

The present invention has several advantages over previous transistor trigger circuits known to the inventor. The present invention provides a very high input impedance to all input signals up to the triggering point. It gives relatively high power output and does not require as high a power-supply voltage for the same output-voltage step. Furthermore, it provides a triggering point that is much more independent of temperature.

In the present invention, a parallel-resonant circuit is connected in the base circuit of a point contact transistor having its emitter biased to cut-off to prevent oscillations from starting. The input voltage is applied to the emitter through an input circuit which presents a very high impedance to the input voltage. When the input voltage is sufficient to overcome this emitter bias, the trigger circuit breaks into class C oscillation. Once oscillations have started, they are maintained even though the input signal is removed.

An object of the present invention is to provide a highly sensitive transistor trigger circuit having a triggering point substantially independent of temperature.

Another object is to provide a transistor trigger circuit that presents a high input impedance and that can be triggered by a signal from a high-impedance source.

Still another object is to provide a transistor trigger circuit that can be used to compare two voltages.

A further object is to provide a transistor trigger circuit having a large output voltage in relation to power-supply voltage.

A still further object is to provide a transistor trigger circuit having a relatively large average power output.

Still another object is to provide a transistor trigger circuit that remains in the triggered condition after the triggering pulse has been removed.

Yet another object is to provide a transistor trigger circuit that breaks into oscillation when an input signal reaches a certain critical value.

Other objects, aspects, uses, and advantages of the invention will become apparent from the following description and from the drawing.

The drawing shows a preferred embodiment of the invention.

Referring to the drawing, transistor 1 is a point contact transistor having an emitter 2, a collector 3, and a base 4. A parallel resonant circuit, consisting of a capacitor 6 and an inductance 7, is connected between base 4 and ground. A battery 8 furnishes a negative voltage to the collector. Another battery 9 furnishes negative bias voltage to emitter 2. Emitter resistor 11 and diode 12, which is preferably of the selenium type, are connected in series between battery 9 and emitter 2. A capacitor 13 is connected as shown between emitter 2 and ground. An isolating resistor 14 and diode 16 are connected as shown between an input terminal 17 and the emitter. Output is taken from across the resonant circuit and applied to a load 18.

When the circuit is first connected up the negative current from the battery 9 flowing to the emitter 2 through the emitter resistance 11 and the back-resistance of the diode 12 biases the emitter to cut-off to prevent oscillations from starting. Suppose now that a negative voltage is initially applied to input terminal 17, and that this voltage is gradually increased in the positive direction. The diode 16 presents a high impedance to the input voltage as long as the input voltage remains more negative than the emitter voltage. When the input voltage is slightly positive so that the negative bias current flowing from the battery 9 through the back-resistance of the diode 12 is overcome, regeneration occurs and the circuit breaks into class C oscillation. Since the impedance between the emitter 2 and the base 4 remains high during cut-off, a high impedance is presented to the input voltage up until the time that oscillations begin. Once the circuit has been triggered class C oscillations continue even though the input voltage is removed. The parallel resonant circuit in the base serves as the tank circuit of the class C oscillator and the emitter resistor 11 and the capacitor 13 correspond to the grid-leak network commonly used in vacuum tube oscillators.

The operation of the circuit may be better understood by an examination of what occurs after triggering. When the cut-off bias on the emitter is overcome by the input voltage, regeneration takes place, the transistor impedances fall to low values, and the transistor conducts heavily causing the voltages on the base 4 and the emitter 2 to fall towards the negative voltage on the battery 8. Conduction continues until the transistor saturates. When conduction ceases, the tank circuit in the base causes the base voltage to begin a damped sinusoidal oscillation. If the transistor 1 failed to conduct again, this damped oscillation would die out after a few cycles. However, the capacitor 13, emitter resistor 11 and diode 12 cause the transistor 1 to begin to conduct again. This can be seen as follows: When conduction ceases, the capacitor 13 has been charged to nearly the negative voltage of the battery 8 by transistor conduction. As the tank circuit swings the base 4 positive, the capacitor maintains the emitter 2 negative causing the transistor to remain cut-off. As the base is swinging positive, the capacitor 13 discharges through the diode 12 and the emitter resistor 11 towards the voltage of battery 9. By the time the base, as a result of the ringing action of the tank circuit, passes zero and starts to go negative again, the capacitor 13 has discharged to the voltage of battery 9. When the base voltage becomes more negative than this voltage of battery 9 on the capacitor 13, the emitter 2 will bemore positive than the base 4 causing the transistor to begin conducting again. The cycle thus will continue to repeat periodically. The parallel resonant circuit in the base, as in the conventional class C oscillator, smooths the intermittent conduction pulses of the transistor 1 so that substantially sine wave oscillations appear across the resonant circuit.

At high frequencies and when there is appreciable stray capacity, capacitor 13 may not be necessary.

Good results have been obtained in the above circuit using a WE1729 transistor as transistor 1, a resonant frequency of about 500 kilocycles, inductance 7 of about 320 microhenries, capacitor 13 of 500 micromicrofarads, a collector supply voltage 8 of −10 volts, an emitter bias 9 of −1.5 volts, and a resistor 11 of 1000 ohms.

As has been stated, the circuit is triggered when the signal voltage applied between input terminal 17 and the "circuit ground" shown increases from a negative value to approximately zero. It will be readily understood, however, that the circuit described can easily be used to compare any two voltages; the voltages to be compared are simply connected in series, with suitable polarities, between input terminal 17 and circuit ground. If it is desired to compare two voltages each of which has one grounded terminal, the "circuit ground" in the circuit shown can be left "floating"—i. e., left ungrounded.

It will also be understood that alternative means of taking output from the circuit can be used. Inductive coupling to tank coil 7 is one possibility; a second coil, either tuned or untuned, can be coupled to coil 7 to obtain impedance matching, voltage gain, or both. Even without using such a second coil, however, the peak-to-peak oscillation voltage across coil 7 as shown can be made three or four times the supply voltage (the voltage of battery 8). It is to be noted that the oscillations are continuous, rather than the blocking type of oscillations that have been produced by certain circuits of the prior art; other things being equal, this means a higher power output.

Another advantage to be emphasized is the relative insensitivity of the present invention to temperature changes. Transistors are subject to large variation of cut-off current $I_{co}$ with temperature, but in the circuit of the present invention this change in cut-off current has much less effect on the triggering voltage than in prior-art circuits. As has been mentioned, certain transistor trigger circuits of the prior art have had a resistor between the base and ground; the quiescent D.-C. bias potential of the base is then subject to variation, and the triggering point therefore varies. In the present invention the inductance that replaces the resistor in the circuit minimizes this source of difficulty.

Variation of triggering point with temperature has been a perplexing problem in prior transistor trigger circuits. In many important applications, electronic equipment must perform reliably and consistently under wide extremes of temperature.

It will be apparent that the embodiments shown are only exemplary and that various modifications can be made in construction and arrangement within the scope of the invention as described in the appended claim.

I claim:

A circuit adapted to switch from a quiescent to an oscillatory state upon receiving a triggering voltage in excess of a predetermined value, said circuit comprising: a transistor having at least an emitter, a collector, and a base; a resonant circuit comprising an inductance and a capacitor in parallel connected between the base and circuit ground; an input terminal for receiving an input voltage from a signal source; a first diode interposed between said input terminal and said emitter, the polarity of said first diode being such that a high input impedance is presented to the signal source when said input voltage is more negative than the voltage on said emitter; a negative bias voltage; a second diode connected between said bias voltage and said emitter, the polarity of said second diode being such that a high impedance is presented to the flow of negative current from said bias source, the magnitudes of said bias source and said high impedance being such that the negative current flowing to said emitter prevents said transistor from oscillating; a resistance interposed in series with said second diode; and a capacitance having one terminal connected to the emitter and the other terminal connected to circuit ground.

References Cited in the file of this patent

UNITED STATES PATENTS

| | | |
|---|---|---|
| 2,565,497 | Harling | Aug. 28, 1951 |
| 2,595,208 | Bangert | Apr. 29, 1952 |
| 2,670,445 | Felker | Feb. 23, 1954 |

FOREIGN PATENTS

| | | |
|---|---|---|
| 678,317 | Great Britain | Sept. 3, 1952 |
| 1,102,896 | France | Oct. 26, 1955 |

OTHER REFERENCES

Article: "Transistor Flip Flop Uses Two Frequencies," by Brock; pages 175–177 of "Electronics" for June 1954.